(12) United States Patent
Fölbach et al.

(10) Patent No.: US 11,047,242 B2
(45) Date of Patent: Jun. 29, 2021

(54) COMPONENT FOR A FLUID FLOW ENGINE AND METHOD

(71) Applicant: Siemens Aktiengesellschaft, Munich (DE)

(72) Inventors: Johannes Fölbach, Vallendar (DE); Lovis Phlippen, Koblenz (DE); Eike Reuter, Aachen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 170 days.

(21) Appl. No.: 15/776,903

(22) PCT Filed: Dec. 2, 2016

(86) PCT No.: PCT/EP2016/079545
§ 371 (c)(1),
(2) Date: May 17, 2018

(87) PCT Pub. No.: WO2017/093461
PCT Pub. Date: Jun. 8, 2017

(65) Prior Publication Data
US 2018/0347377 A1    Dec. 6, 2018

(30) Foreign Application Priority Data

Dec. 3, 2015  (EP) ..................................... 15197795
Aug. 4, 2016  (EP) ..................................... 16182826

(51) Int. Cl.
*F01D 5/18*    (2006.01)
*B22F 5/00*    (2006.01)
(Continued)

(52) U.S. Cl.
CPC .............. *F01D 5/187* (2013.01); *B22F 5/009* (2013.01); *B22F 5/04* (2013.01); *B22F 10/20* (2021.01);
(Continued)

(58) Field of Classification Search
CPC . F01D 5/186; F01D 5/187; F01D 9/00; F05D 2260/202; F05D 2260/204;
(Continued)

(56) References Cited

U.S. PATENT DOCUMENTS 5,320,485 A * 6/1994 Bourguignon .......... F01D 5/187
                                                     415/115
5,486,090 A    1/1996 Thompson et al.
(Continued)

FOREIGN PATENT DOCUMENTS

CN    103382857 A    11/2013
EP      1533480 A2    5/2005
(Continued)

OTHER PUBLICATIONS

International Search Report dated Feb. 3, 2017, for PCT/EP2016/079545.
(Continued)

*Primary Examiner* — David Hamaoui
*Assistant Examiner* — Jesse M Prager

(57) ABSTRACT

A component for a fluid flow engine, such as a gas turbine, includes a first side, e.g. a top side and a second side, e.g. a bottom side, wherein the component further includes a mesh of interior channels for guiding a fluid through the component, wherein a fluid inlet being in fluid communication with channels of the mesh is provided at the first side and at the second side, respectively, and wherein the mesh is further arranged and configured such that channels originating from the fluid inlet of the first side and channels originating from the fluid inlet of the second side are interlaced such that a fluid entering the component is at least partly guided according to opposing directions in the mesh.

15 Claims, 3 Drawing Sheets

(51) Int. Cl.
*B22F 5/04* (2006.01)
*B33Y 80/00* (2015.01)
*B33Y 10/00* (2015.01)
*F01D 9/00* (2006.01)
*B22F 10/20* (2021.01)
*B22F 10/30* (2021.01)

(52) U.S. Cl.
CPC ............ *B33Y 10/00* (2014.12); *B33Y 80/00* (2014.12); *F01D 5/186* (2013.01); *F01D 9/00* (2013.01); *B22F 10/30* (2021.01); *F05D 2260/201* (2013.01); *F05D 2260/202* (2013.01); *F05D 2260/204* (2013.01); *Y02P 10/25* (2015.11)

(58) Field of Classification Search
CPC ...... F05D 2260/201; B22F 5/009; B22F 5/04; B22F 3/1055; B22F 2003/1057; B33Y 80/00; B33Y 10/00; Y02P 10/245
See application file for complete search history.

(56) References Cited

U.S. PATENT DOCUMENTS

| | | | |
|---|---|---|---|
| 5,624,231 A | 4/1997 | Ohtomo et al. | |
| 5,690,472 A * | 11/1997 | Lee | F01D 5/187 416/95 |
| 6,261,054 B1 | 7/2001 | Bunker et al. | |
| 8,517,667 B1 * | 8/2013 | Liang | F01D 5/186 415/115 |
| 2005/0025613 A1 * | 2/2005 | Strangman | B23P 15/006 415/1 |
| 2005/0106020 A1 * | 5/2005 | Bunker | F01D 5/187 416/97 R |
| 2005/0106021 A1 * | 5/2005 | Bunker | F01D 5/187 416/97 R |
| 2005/0214118 A1 | 9/2005 | Dodd | |
| 2009/0274549 A1 | 11/2009 | Mitchell et al. | |
| 2011/0044822 A1 | 2/2011 | Hada et al. | |
| 2011/0123351 A1 | 5/2011 | Hada et al. | |
| 2011/0262695 A1 * | 10/2011 | Lee | F01D 5/182 428/131 |
| 2011/0293434 A1 * | 12/2011 | Lee | B22C 7/026 416/229 R |
| 2012/0014810 A1 * | 1/2012 | Antunes | F01D 5/14 416/97 R |
| 2012/0070306 A1 * | 3/2012 | Lee | F01D 5/187 416/97 R |
| 2013/0280094 A1 | 10/2013 | Hada et al. | |
| 2015/0086408 A1 | 3/2015 | Kottilingam et al. | |
| 2015/0184530 A1 * | 7/2015 | Iduate | F01D 9/065 60/805 |
| 2015/0218951 A1 * | 8/2015 | Weaver | F01D 5/187 416/1 |
| 2016/0076384 A1 * | 3/2016 | Snyder | F01D 9/02 415/115 |
| 2017/0145832 A1 * | 5/2017 | Mongillo | F01D 5/187 |

FOREIGN PATENT DOCUMENTS

| | | |
|---|---|---|
| EP | 2626519 A1 | 8/2013 |
| GB | 2443116 A | 4/2008 |
| JP | H07189602 A | 7/1995 |
| JP | H09511304 A | 11/1997 |
| JP | 2004353550 A | 12/2004 |
| JP | 2012202335 A | 10/2012 |
| JP | 2015067902 A | 4/2015 |
| WO | 2014105108 A1 | 7/2014 |

OTHER PUBLICATIONS

EP Search Report dated May 10, 2017, for EP patent application No. 16182826.4.
IPRP (PCT/IPEA/416 and 409) dated Nov. 8, 2017, for PCT/EP2016/079545.

* cited by examiner

COMPONENT FOR A FLUID FLOW ENGINE AND METHOD

CROSS REFERENCE TO RELATED APPLICATIONS

This application is the US National Stage of International Application No. PCT/EP2016/079545 filed Dec. 2, 2016, and claims the benefit thereof. The International Application claims the benefit of European Application No. EP16182826 filed 4 Aug. 2016 and European Application No. EP15197795 filed 3 Dec. 2015. All of the applications are incorporated by reference herein in their entirety.

FIELD OF INVENTION

The present invention relates to a component for a fluid flow engine, such as a gas turbine comprising, inter alia, a mesh of interior channels, such as cooling channels. Furthermore, the present invention relates to a method of additively manufacturing the same.

Advantageously, the mentioned component is manufactured by means of powder bed methods, such as selective laser melting and/or electron beam melting.

BACKGROUND OF INVENTION

These are relatively well known methods for fabricating, prototyping or manufacturing parts or components from powder material, for instance. Conventional apparatuses or setups for such methods usually comprise a manufacturing or build platform on which the component is built layer-by-layer after the feeding of a layer of base material or powder which may then be melted, e.g. by the energy of a laser beam and subsequently solidified. The layer thickness is determined by a wiper that moves, e.g. automatically, over the powder bed and removes excess material. Typical layer thicknesses range from 20 μm or 40 μm. During the manufacture, said laser beam scans over the surface and melts the powder in selected areas which may be predetermined by a CAD-file according to the geometry of the component to be manufactured.

Turbine components, such as blades or vanes of gas turbines need to be cooled during its intended operation in order to resist the high thermal loads caused by the hot gas exposure during. Flow path hardware of gas turbines is currently, e.g. required to resist temperatures of up to 1500° C. during its intended operation in order to increase energy efficiency of the respective engine.

Therefore, a predetermined portion of cooling air or another cooling fluid is, e.g. guided through the component from the inside. Thus, the component is cool and said fluid then leaves the component at dedicated outlet openings, e.g. to provide for film or effusion cooling. Thereby, of course, stability of the component has to be maintained. This is particularly important as—in case of vanes or blades of turbines—the components are also exposed to high mechanical loads, such as pressure or suction loads during operation.

As the cooling air is usually branched off the standard working fluid flow, it has to be applied economically, since a "cooling portion" of the fluid flow does not contribute to energy conversion or generation of the component. Thus, it is usually expedient to apply cooling mechanisms mainly to certain "hotspots" of the component which are exposed to maximum thermal loads.

The prior art, e.g. describes a plurality of cooling principles, particularly serpentine, effusion and/or film cooling of turbine components.

A gas turbine component cooling arrangement is e.g. known from GB 2 443 116 A.

There is, however, still a stringent demand for improving cooling principles for turbo machines, as fuel consumption of the related machines has to be reduced as much as possible, e.g. due to climatic and/or economic requirements and industrial changes.

SUMMARY OF INVENTION

It is thus an object of the present invention to provide for an improved component and/or a cooling principle which addresses the mentioned problems.

The mentioned object is achieved by the subject-matters of the independent claims. Advantageous embodiments are subject-matter of the dependent claims.

The present invention relates to a component for a fluid flow engine, such as a gas turbine, comprising a first side, e.g. a top side and a second side, e.g. a bottom side, wherein the component further comprises a mesh or web of interior channels for guiding a fluid, such as a cooling fluid, through the component.

The first side and the second side advantageously define the outer extensions or dimensions of the component.

Said channels advantageously relate to cooling channels. To this effect, the mentioned fluid is advantageously a cooling fluid intended for effecting a cooling of the component during its intended operation.

The component is provided with a fluid inlet at the first side, the fluid inlet being in fluid communication with at least some of the channels of the mesh.

The component is provided with a fluid inlet at the second side, the fluid inlet being in fluid communication with at least some of the channels of the mesh.

The fluid inlet is advantageously provided at the first side and at the second side respectively.

The mesh is further arranged and configured such that channels originating from the fluid inlet of or provided at the first side and channels originating from the fluid inlet of or provided at the second side are interlaced such that the fluid entering the component is at least partly guided according to opposing directions in the mesh.

The term "interlaced" shall mean that the channel paths at least partly overlap in the mesh or extend collinearly, e.g. viewed in a plane orthogonal to the first and/or the second side.

Advantageously, thereby, an improved and novel cooling concept is presented which allows for a particular efficient and homogeneous cooling of the component. Further, the presented concept provides for outstanding fail-safe properties (see below) and to maintain a proper mechanical stability of the component during operation.

More particularly, a transition between serpentine cooling channels or pipes and the known diffusion cooling may be presented.

A cooling fluid may particularly enter an inside of the component, advantageously from the first and the second side, i.e. advantageously from the top and the bottom side or face of the component for cooling the same. A particular advantage of the prior art of the present component is advantageously that a cooling effect of the component may be thus be homogenized, as the fluid may—according to the present invention—advantageously enter the component at opposing side faces. This leads to a more effective cooling as compared to the prior art, wherein a cooling fluid may only enter the respective turbine blade from a bottom or first side, while it subsequently leaves the component at an opposing tip or second side. Thereby, a significant and/or adverse temperature gradient may be generated from the bottom to the tip of the component as the cooling fluid is already heated up to elevated temperatures when it enters the tip of the component. In other words, the cooling effect decreases, the longer it has already effected a cooling for and in the component.

Thus, at the tip of the component, the cooling effect is weak and thermal influences may occur predominantly at the tip due to an insufficient cooling. The presented principle is further improved in that the mesh of the interior channels is provided which may be adapted to the required cooling functionality, depending on the actual application of the component in the engines or turbine's flow path.

In an embodiment, the first side is a top side, e.g. a tip, and the second side is a bottom side, e.g. a root, of the component and wherein the top and the bottom side and/or the respective channels or branches of the mesh are arranged opposingly, such as turned with respect to each other at an angle of 180°. This geometry may particularly allow a smart and efficient cooling of the component.

In an embodiment, the component comprises a plurality of fluid inlets at the first side and plurality of fluid inlets at the second side. By means of this embodiment, the presented mesh of cooling channels may be provided effectively with, e.g. a cooling fluid and the cooling fluid may as well be distributed—via the mesh—in the component in an advantageous fashion. Moreover the interlaced geometry of cooling channels may be achieved in expedient way.

In an embodiment, the interior channels are cooling channels and the fluid is a cooling fluid.

In an embodiment the channels extend from the fluid inlets almost over distance between the first and the second side of the component. This embodiment may further be advantageous in order to solve the inventive problems.

In an embodiment, the channels extend from the fluid inlets over more than half of the distance between the first side and the second side of the component.

In an embodiment, the channels taper or lead into (ever) smaller channels of the mesh, i.e. e.g. interior channels with smaller diameters or cross sections in a direction corresponding to a fluid flow direction or course. This embodiment particularly allows for an advantageous heat transfer from the component to the fluid flow.

In an embodiment, the channels forming or comprising the mesh are arranged in a fractal fashion of a regular or irregular branching pattern leading the flow from larger to smaller diameter passages.

In an embodiment, the mesh is configured such that the channels and/or the smaller channels are branched and each lead into a plurality of fluid outlets. This embodiment is particularly advantageous, as cooling air may be saved and, further, a film cooling for the component may be facilitated wherein e.g. the surface of the component is expediently cooled.

In an embodiment, the channels are cooling channels and the mesh is (at least substantially) homogeneously distributed between the first side and the second side. Thereby, it may be achieved that e.g. the surfaces of the component cooled in a homogeneous fashion. In other words, the cooling fluid spent for cooling the component may be effectively used and the component may be prevented from being exposed to excessive or destructive thermal loads.

In embodiment, the mesh extends inhomogeneously between the first side and the second side.

In an embodiment, the mesh is adapted to an individual temperature load, the component is exposed or expected to be exposed to in an intended operation, wherein the mesh is e.g. densified at surface regions of the component of a particular high temperature load.

In an embodiment a density of the mesh of interior channels is increased at surface regions of the component which are exposed to a particular high temperature load as compared to surface regions exposed to a minor temperature load.

Said densification may mean, that the mesh is configured with an increased number of channels and e.g. smaller channels in those regions of the component which are expectedly exposed to higher temperatures during operation.

In an embodiment, the channels are arranged and configured to empty towards a surface of the component in order to facilitate a surface cooling, such as film or effusion cooling, of the component. Advantageously, the cooling channels are configured such that the larger channels lead or taper into smaller channels and each of the smaller channels leads into the surface of the component.

In an embodiment, the component is a part a component applied in the flow path hardware of a gas turbine.

In an embodiment, the component is a blade or vane of a turbine, and wherein the channels are cooling channels for guiding a cooling fluid through the component.

A further aspect of the present invention relates to a turbine, such as a gas turbine, comprising the component.

A still further aspect of the present invention relates to a method of additively manufacturing the component, wherein selective laser melting or electron beam melting is used for the manufacture.

In an embodiment, the design of the mesh is designed and/or optimized with respect to the following quantities by means of computer aided-software and/or simulation: fluid temperature, fluid mass flow, heat transfer, thermal expansion, Young's modulus, creep durability rupture durability and/or further mechanical, thermal and/or material-specific properties or quantities of the respective component or it's material.

In an embodiment a combination of additive manufacturing and the mentioned design optimization is used to effect non-deterministic design solutions for the mesh and/or the component by eliminating limitations of conventional design and manufacturing methodologies or the respective technology.

The present invention may further relate to the following aspects:

1. Component for a fluid flow engine comprising a plurality of cooling channels arranged between opposing outer walls of the component, wherein the cooling channels extend at least partly between a top surface and a bottom surface of the component, and wherein each of the cooling channels leads into a web of smaller channels in order to achieve an effective cooling of the component.

2. Component according to aspect 1, wherein the component is configured such that a cooling fluid can enter to the cooling channels at the top surface and the bottom surface of the component.

3. Component according to aspect 1 or 2, wherein the cooling channels are arranged and configured such that the cooling channels taper originating from the top surface and/or the bottom surface.

4. Component according to one of the previous aspects, wherein the smaller channels are arranged and configured to empty towards the outer walls of the component in order to facilitate film cooling.

Advantages, features and/or embodiments relating herein to the described component or turbine may as well pertain to the described method.

BRIEF DESCRIPTION OF THE DRAWINGS

Further features, expediencies and advantageous refinements become apparent from the following description of the exemplary embodiment in connection with the Figures.

Like elements, elements of the same kind and identically acting elements may be provided with the same reference numerals in the Figures.

DETAILED DESCRIPTION OF INVENTION

Figure 1:
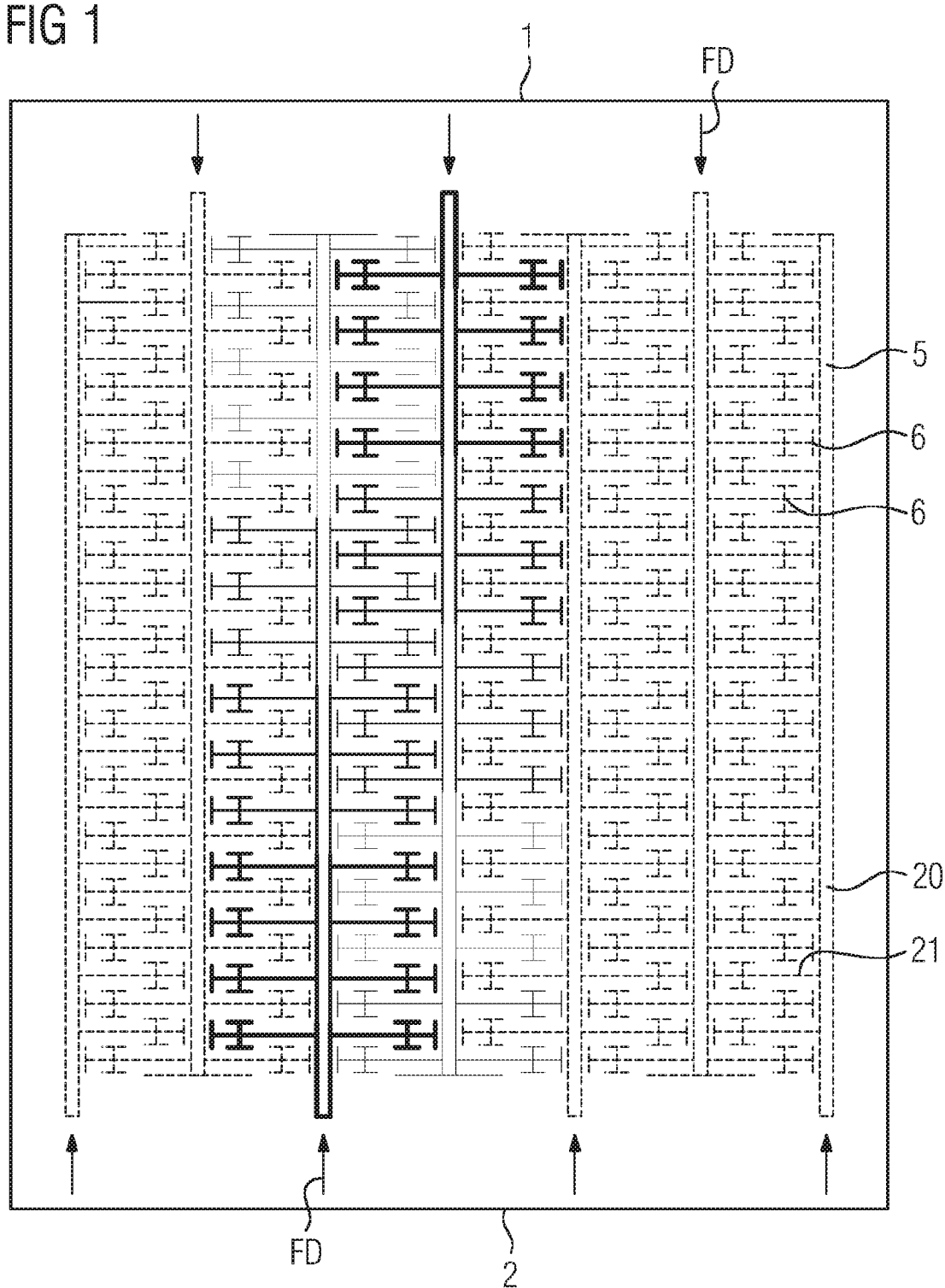
FIG. 1 shows a schematic of a longitudinal section of an inventive component according to the present invention.

FIG. 1 shows in a schematic at least parts of a component 100. The component 100 is advantageously a part of the flow path hardware of a fluid flow engine, such as a gas turbine. Most advantageously, the component constitutes a blade or vane of a gas turbine.

In particular, FIG. 1 shows a mesh 5 or web of interior channels 20 of the component 100. The channels 20 may be major channels. The channels are expediently cooling channels for guiding a fluid flow through the component in order to cool it during its intended operation. The mesh 5 extends between a first side 1 and a second side 2 of the component 100. The channels 20 particularly represent interior cooling channels for cooling the component 100 from the inside, when the cooling flow, such as cooling air, is guided through. The cooling air for cooling the component may though have temperature of up to 600° C. This may still allow for an efficient cooling of the component and an expedient protection from excessive thermal loads e.g. at temperatures of up to 1500° C. or even more during the operation of the component.

The first side 1 advantageously denotes a top side or tip of the component 100, wherein the second side advantageously denotes a bottom or root side of the component 100.

It is shown, that at the first side 1 as well as at second side 2, a plurality of fluid inlets 10 are shown (cf. arrows in FIG. 1).

The inlets 10 provided at the first side are advantageously arranged next to each other and lead into channels 20 of the mesh 5. The same holds for the fluid inlets 10 provided at the second side 2. Thus, e.g. a coolant fluid (not explicitly indicated) entering the mesh 5 via the fluid inlets 10 at the first side 1, are led towards the second side, i.e. another section of the component 100.

In case of gas turbine components 100, such as blades or vanes, the first side 1 and the second side 2 advantageously define a suction side 4 well as pressure side 3 of the component (cf. numerals 3, 4 below). Pressure side and suction side 3, 4 may form a streaming or working surface of the component and may each extend over the plane of the image in FIG. 1.

The mesh 5 is distributed or disposed substantially homogeneously over the whole component 100, e.g. viewed in a top view. Thus, an almost homogeneous cooling effect may be achieved.

FIG. 1 advantageously shows a longitudinal section of an airfoil of the component such that the mentioned suction side and a pressure side of the blade or vane overlap or extend over the mesh 5 (cf. above).

It is particularly shown in FIG. 1 that the channels 20 taper or lead into even smaller channels 21. The channels 21 may be minor channels.

The channels 20, 21 forming or comprising the mesh 5 may be arranged in a fractal fashion of a regular or irregular branching pattern and may be arranged to lead the flow of fluid from larger channels 20 to the smaller diameter channels or passages 21.

Channels 20, 21 originating from or being fluidly connected to oppositely arranged fluid inlets 10 are advantageously interlaced, i.e. that the channels originating from fluid inlets 10 of the opposing sides 1, 2, overlap in the extensions and any perceivable direction, advantageously without being fluidity connected. Advantageously only the channels originating from one side (i.e. the first side 1 or the second side 2) are in fluid communication in order to allow for an efficient cooling.

Figure 2:
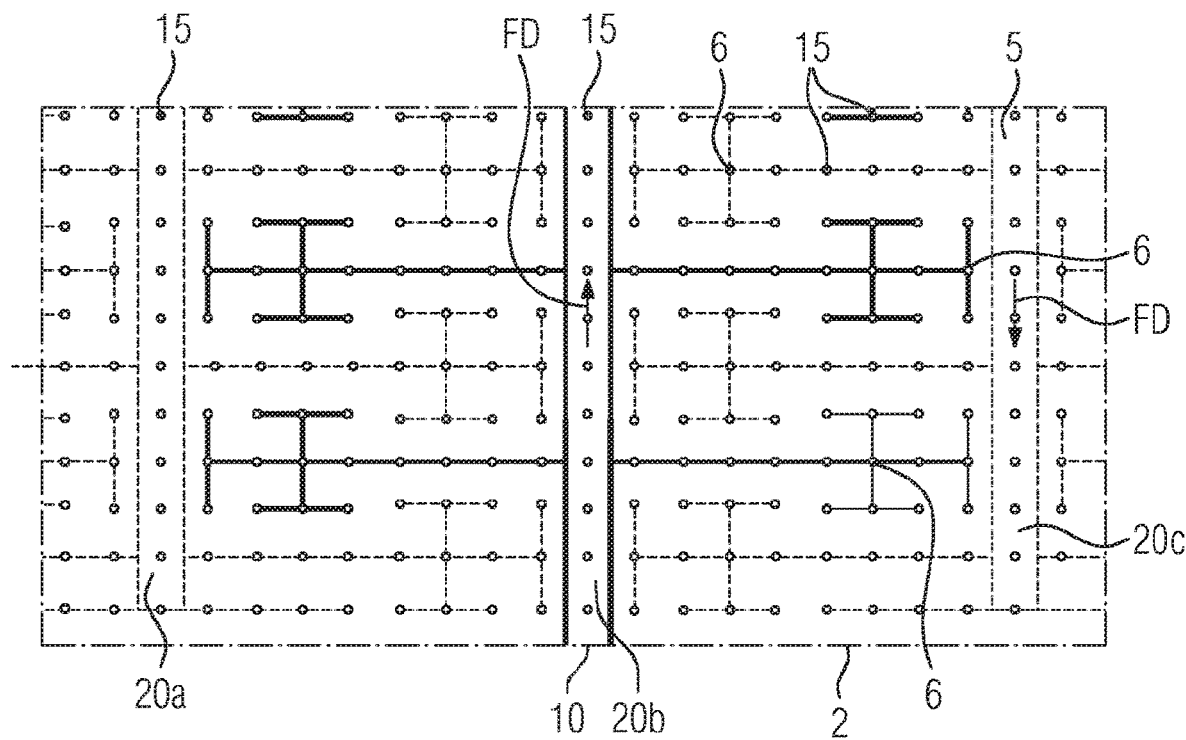
FIG. 2 shows parts of the image of FIG. 1 in greater detail.

In other words, the mesh 5 may further be arranged and configured such that channels originating from the fluid inlet of the first side and channels originating from the fluid inlet of the second side are interlaced such that a fluid, e.g. a coolant, entering the component 100 is at least partly guided according to opposing flow directions FD in the mesh 5 (cf. opposingly aligned arrows in FIGS. 1 and 2 indicating said flow directions).

A cooling fluid (not explicitly indicated in the Figures) entering the component via a fluid inlet 10 and according to flow direction FD expediently cools the component 100, wherein the cooling efficiency decreases, the further the fluid has already flown through the mesh 5. This effect is illustrated exemplarily by the bold indication of the second channel 20 (from left to right) originating from the second side 2 and the middle channel 20 at the first side 1, wherein the bold type indication decreases along with the cooling effect, the further the respective channel 20 extends into the component 100. Due to the interlaced geometry of channels 20, 21 as described, the component 100 may be pervaded by the mesh 5 from the first side 1 as well as from the second side 2. Thus, all sections of the component may be cooled homogeneously and/or according to an equal efficiency as the cooling effects originating from cooling fluid entering the component 100 from the first side 1 and the second side 2 equalize.

The channels 20, 21 may further constitute pipes.

Advantageously, the channels 20 extend from the fluid inlets over more than half of the distance between the first side 1 and the second side 2 of the component 100.

Advantageously, the channels 20 extend accordingly over more than 50%, 60%, 70%, or more advantageously, 80% of the distance (cf. vertical length of the component or depicted section in FIG. 1) between the first side 1 and the second side 2 of the component 100.

Furthermore, the channels 20 are advantageously branched or lead into even smaller channels 21. The numeral "6" particularly indicates a branch of interior channels of the mesh 5, e.g. wherein the cooling fluid guided through a channel 20 in a direction corresponding to a flow direction FD may enter into smaller channels 21.

The flow direction FD is particularly indicated by means of the arrows pointing to the fluid inlets 10 in FIG. 1.

As indicated e.g. in FIGS. 1 and 2, the mesh and/or the branches thereof may be interlaced at least partly in or according to three independent spatial directions, such as from the first side 1 to the second side 2 or according to a transverse (horizontal) direction.

Furthermore ort expressed in other words, the channels 20, 21 may be interlaced according to any perceivable and actual flow direction.

Advantageously, the small channels 21 form or constitute the mesh 5 or network structure. The small channels 21 and therewith the cooling flow paths lead or empty towards main walls or surfaces 7 of the component 100. Furthermore, for each inlet 10 of the component 100, the channels 20 advantageously lead into the smaller channels 21 and finally into a plurality of outlets 15. Thereby, a film cooling or even effusion cooling may be facilitated.

Although not being explicitly indicated in the Figures, the channels 21 may e.g. taper or lead into even smaller channels (not explicitly indicated).

The diameters of the channels 20 and the channels 21 can be varied according to individual demands in terms of heat development during an operation of the component 100. The channels 21 may as well have a bionic or biomimetic or bionically engineered or improved geometry and may thinned from a section, wherein the smaller or small channels 21 are connected to the channels 20 or vice versa.

FIG. 2 shows a part or section of the image of FIG. 1 in more detail. It is shown, e.g. that the fluid outlets 15 are provided equidistantly at sites along the channels 20 and the smaller channels 21 including the ends of the channels 20, 21.

The channels 20, 21 are cooling channels and generally arranged and configured to empty towards a surface (not explicitly indicated the component 100 in order to facilitate a surface cooling, such as a film cooling of e.g. surfaces of the component forming the pressure side 3 and the suction side 4 of the component 100. As there is a plurality of fluid outlets 15 provided in a dense array all over the mesh 5, even a so-called effusion cooling of the component may be facilitated. Moreover, the described design including the mesh 5 and the plurality of outlets 15 leading to surfaces of the component 100 is also advantageous in terms of fail-safe properties of the component 100, as a possible deficit in small channels 21 does not significantly affect the cooling properties of the whole component, but may at most have local effects. By the interlaced nature of the proposed mesh structure the same proportion of the component is advantageously fed or provided with a coolant fluid from different sides 1, 2 via different branches or channels 20 of the mesh network. This unique feature prevents breakdown of the coolant supply to said proportion even if one or more single supply channels are clogged or fail.

Furthermore, by progressing from larger to ever branched smaller channels from an interior to an exterior or superficial region of the component, any local breach or failure will open up channel ways of progressingly larger diameter, locally ejecting more coolant fluid and intensifying the cooling there. Such a deficit may thereby be self-healed.

FIG. 2 shows on the left a channel 20a which may originate from the first side 1 of the component (cf. FIG. 1). The channel 20a is expediently fluidly connected to a corresponding fluid inlet at the first side 1, as described. The same holds for a channel 20c which is shown on the right in FIG. 2. Between the channel 20a and the channel 20c, FIG. 2 shows a channel 20b originating from the fluid inlet 10 of the second side 2 of the component 100 (cf. bottom of the image of FIG. 2 in the middle). As indicated above, a cooling fluid just entering the channel 20b from the second side 2 allows for an advantages cooling effect, while a cooling fluid guided through the depicted sections of channels 20a and 20c may have a weaker cooling effect, as the cooling fluid may already be heated to elevated temperatures. However, in average, e.g. viewed from the left to the right in FIG. 2, the cooling of the component 100 effected by said cooling fluid may be effective due to the described interlaced geometry of interior cooling channels 20, 21.

The described effect is of course enhanced by the interlaced geometry of the smaller channels 21 which are also interlaced, such that an effective cooling of the component 100 may be facilitated even in regions between the major channels 20. Particularly, viewed from the bottom (i.e. second side 2) to the top in FIG. 2 (i.e. first side 1), branches 6 or smaller channels 21 of adjacent channels 20 alternate in order to embody the mentioned interlaced geometry.

As an alternative to the described design of the mesh 5, the outlets 15 may be provided, manufactured or arranged arbitrarily or non-equidistantly. This arrangement may be advantageous, in case where the mesh geometry shall be adapted to a particularly expected or measured (individual) temperature load. E.g. a turbine blade is exposed to highest temperatures usually at a leading edge or pressure side (cf. e.g. left side or edge in FIGS. 1 and 2).

Figure 3:
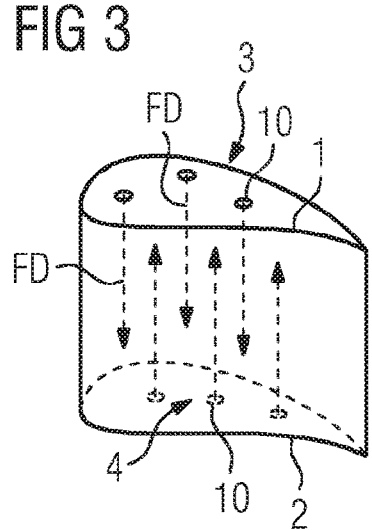
FIG. 3 shows a schematic perspective view of a component according to the present invention.

FIG. 3 indicates a specific embodiment of the component as a turbine airfoil of a corresponding blade or vane, e.g. applied in a gas turbine. The interlaced geometry of the channels 20 is particularly shown in a simplified way, wherein the estimated fluid flow direction FD is indicated by the dashed arrows. The inlets 10 are also shown, however without explicitly showing inlet pipes for the channels. Advantageously, the number of fluid inlets 10 or corresponding channels at the first side 1 equals to the corresponding number of inlets provided at the second side 2. However, the number of fluid inlets 10 and/or outlets 15 may—additionally or alternatively—be adapted to the individual cooling requirements.

Figure 4:
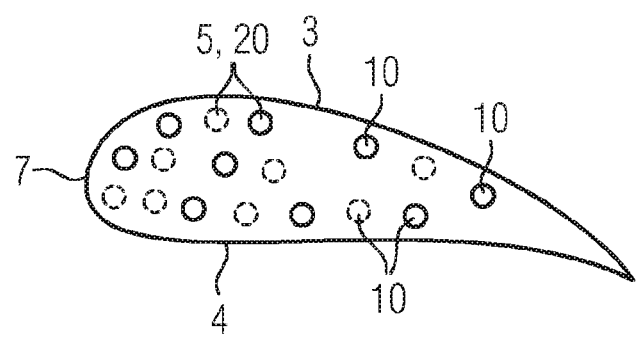
FIG. 4 shows a schematic cross-sectional view of the component.

FIG. 4 shows a simplified side or sectional view of the component 100 taken parallel to the first side 1 and/or the second side 2 or the corresponding surfaces. It is shown that the density of fluid inlets 10 and therewith advantageously the density of (major) cooling channels 20 may vary according to the expected temperature distribution in the operation of the component 100 (cf. above). Particularly, at close to a leading edge 7 or a corresponding surface region, the component 100 may have an increased or densified number of channels 20, 21 in the mesh 5 as indicated. Said densified mesh structure is advantageously provided due to an (expectedly) higher thermal load as compared to further regions of the component 100. A particular high thermal load is usually exposed to a leading edge (cf. numeral 7 in FIG. 4) of the component 100 in its intended operation. In this way, at the leading edge 7 and/or the suction side 4, the component 100 is provided with an increased density of interior channels 20, 21.

The design or distribution of interior channels 20, 21 may thus be inhomogeneous in contrast to the indications in the Figures, wherein a denser mesh may be provided at hot spots, e.g. at the leading edge 7 and/or suction side for of the component 100 as mentioned.

The distribution and/or design of cooling channels 20, 21 may thus vary along a cross section of the component is shown e.g. in FIG. 4 as well as along a longitudinal section of the component, e.g. as shown in FIGS. 1 and 2.

Figure 5:
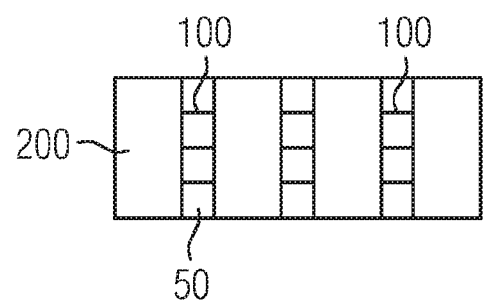
FIG. 5 shows a simplified schematic of a turbine comprising the component.

FIG. 5 indicates schematically a turbine, advantageously a gas turbine, comprising the component 100. In case of turbine blades or vanes, the turbine advantageously comprises a multiplicity of components 100, as described. This is indicated in FIG. 5 showing various turbine stages 50, each of which being equipped with a plurality of blade components. Moreover, the described component 100 may be present as vanes of the turbine 200, wherein an according mesh is provided for cooling of the respective vane in the operation of the component Although not being explicitly indicated in the Figures, the component 100 may as well pertain to other parts of the flow path hardware of fluid flow engines or turbines, such as parts of the burner components or parts of a combustion chamber of the turbine.

The component 100 along with the described mesh 5 of channels 20, 21 as described herein is advantageously additively manufactured by means of selective laser melting or electron beam melting.

The mesh 5 is, advantageously, designed and/or optimized with respect by means of computer aided-software and/or simulation means. Thereby, particularly the following aspects and/or parameters may be calculated and/or optimized: fluid temperature, fluid mass flow, heat transfer, thermal expansion, Young's modulus, creep durability rupture durability and/or further mechanical, thermal and/or material-specific properties or quantities of the respective component or it's material. Particularly, the optimizing software may comprise genetic optimization algorithms that act upon target functions relating to the above listed design of the mesh and/or further aspects of the component. The optimized design of the mesh, the interlaced geometry and/or the channels, may thus be highly irregular and, advantageously not derivable by deterministic design approaches. The combination of optimization algorithms and additive manufacturing is further provided to exploit the respective synergetic advantages in the areas of design and operational performance of the component which may be counter-intuitive, unprecedented and/or not accessible by the deterministic design approaches. The advantages of the component or mesh design may thus only be achieved or facilitated by applying (non-conventional) additive manufacturing technology.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A component for a fluid flow engine, comprising:
a first side comprising a first side fluid inlet, a first major channel originating at the first side fluid inlet, extending toward a second side, and branching into a plurality of first branch channels, and a plurality of first fluid outlets distributed along the plurality of first branch channels,
the second side comprising a second side fluid inlet, a second major channel originating at the second side fluid inlet, extending toward the first side, and branching into a plurality of second branch channels, and a plurality of second fluid outlets distributed along the plurality of second branch channels, and
a solid region between the first major channel and the second major channel,
wherein the plurality of first branch channels extend laterally from the first major channel into the solid region, and the plurality of second branch channels extend laterally from the second major channel into the solid region,
wherein the first major channel, the plurality of first branch channels, the second major channel, and the plurality of second branch channels are interlaced in three independent spatial directions with each other into a mesh, and
wherein a fluid flowing in the first major channel is at least partly guided in a direction opposite to a fluid flowing in the second major channel, and wherein a flow area of a first branch channel of the plurality of first branch channels is smaller than a flow area of the first major channel, and a flow area of a second branch channel of the plurality of second branch channels is smaller than a flow area of the second major channel.

2. The component according to claim 1, wherein the first side is a top side and the second side is a bottom side, and wherein the top side and the bottom side are arranged opposingly.

3. The component according to claim 1, further comprising: a plurality of fluid inlets at the first side and at the second side.

4. The component according to claim 1, wherein the mesh extends over a majority of a distance between the first side and the second side.

5. The component according to claim 1, wherein the first major channel, the plurality of first branch channels, the second major channel, and the plurality of second branch channels are cooling channels and the mesh is homogeneously distributed between the first side and the second side.

6. The component according to claim 1, wherein the first major channel, the plurality of first branch channels, the second major channel, and the plurality of second branch channels are cooling channels and the mesh extends inhomogeneously between the first side and the second side, wherein the mesh is adapted to an individual temperature load the component is exposed to in an intended operation.

7. The component according to claim 1, wherein a density of the mesh is increased at surface regions of the component which are exposed to a particular high temperature load as compared to surface regions exposed to a minor temperature load.

8. The component according to claim 1, wherein the first major channel, the plurality of first branch channels, the second major channel, and the plurality of second branch channels are cooling channels being arranged and configured to employ towards a surface of the component in order to facilitate a surface cooling.

9. The component according to claim 1, wherein the component is a blade or vane of a turbine, and wherein the first major channel, the plurality of first branch channels, the second major channel, and the plurality of second branch channels are cooling channels for guiding a cooling fluid through the component.

10. A turbine comprising: the component according to claim 1.

11. A method of additively manufacturing the component according to claim 1, comprising: building-up the component via selective laser melting or electron beam melting.

12. The component according to claim 1, wherein the fluid flow engine is a gas turbine.

13. A component for a fluid flow engine, comprising:
a first side, a second side, and a surface extending therebetween;
a plurality of first channels, each first channel of the plurality of first channels comprising a first main channel originating at the first side and extending toward the second side, and a plurality of first branch channels extending laterally from the first main channel;
a plurality of second channels, each second channel of the plurality of second channels comprising a second main channel originating at the second side and extending toward the first side, and a plurality of second branch channels extending laterally from the second main channel;
a plurality of first openings to the surface distributed along at least the plurality of first branch channels; and
a plurality of second openings to the surface distributed along at least the plurality of branch second channels;
wherein first channels of the plurality of first channels are staggered with second channels of the plurality of second channels;
wherein between a first main channel of a first channel of the plurality of first channels and an adjacent second main channel of a second channel of the plurality of second channels, branch channels of the plurality of first branch channels of the first channel are staggered with branch channels of the plurality of second branch channels of the second channel, and
wherein the first main channel, the plurality of first branch channels, the second main channel, and the plurality of second branch channels are interlaced in three independent spatial directions with each other into a mesh.

14. The component of claim 13, wherein the plurality of first openings are distributed along the first main channels and along the pluralities of first branch channels, and wherein the plurality of second openings are distributed along the second main channels and along the pluralities of second branch channels.

15. The component of claim 13, comprising a solid body comprising the first side, the second side, and the surface extending therebetween.

* * * * *